United States Patent [19]
Katsuya et al.

[11] Patent Number: 6,081,310
[45] Date of Patent: Jun. 27, 2000

[54] REFLECTION-TYPE LIQUID CRYSTAL DISPLAY HAVING A SILVER OR SILVER ALLOY UPPER ELECTRODE LAYER

[75] Inventors: Yoko Katsuya; Yutaka Takafuji, both of Nara; Atsushi Iwakiri, Tenri; Tomoko Fujii, Nara, all of Japan

[73] Assignee: Sharp Kabushiki Kaisha, Osaka, Japan

[21] Appl. No.: 09/185,010

[22] Filed: Nov. 4, 1998

[30] Foreign Application Priority Data

Nov. 25, 1997 [JP] Japan ........................... 9-322712
Aug. 6, 1998 [JP] Japan ........................... 10-222859

[51] Int. Cl.[7] ................... G02F 1/1335; G02F 1/1343
[52] U.S. Cl. ................................ 349/113; 349/147
[58] Field of Search ........................ 349/113, 147, 349/148

[56] References Cited

U.S. PATENT DOCUMENTS

| | | | |
|---|---|---|---|
| 4,589,732 | 5/1986 | Shiraishi et al. | 349/111 |
| 5,280,373 | 1/1994 | Ozawa et al. | 349/113 |
| 5,550,658 | 8/1996 | Yoshihiro | 349/113 |

*Primary Examiner*—Walter Malinowski
*Attorney, Agent, or Firm*—Nixon & Vanderhye P.C.

[57] ABSTRACT

A reflection-type liquid crystal display device includes a first substrate including a plurality of pixel electrodes arranged in a matrix and switching devices for driving the pixel electrodes. A second substrate includes a counter electrode, and a liquid crystal layer is interposed between the first substrate and the second substrate. The pixel electrodes each include a lower electrode layer and an upper electrode layer. The upper electrode layer is formed of either silver or a silver alloy and is reflective.

50 Claims, 14 Drawing Sheets

REFLECTION-TYPE LIQUID CRYSTAL DISPLAY HAVING A SILVER OR SILVER ALLOY UPPER ELECTRODE LAYER

BACKGROUND OF THE INVENTION

1. Field of the Invention

The present invention relates to a liquid crystal display device using a switching device such as a thin film transistor, and in particular to a reflection-type liquid crystal display device including a reflection electrode formed of a metal material connected to a switching device and a method for producing the same. In this specification, a liquid crystal display device will be referred to as an "LCD device", and a thin film transistor will referred to as a "TFT".

2. Description of the Related Art

Recently, semiconductor devices such as ICs and LSIs, and industrial- and home-use electric and electronic devices and appliances including such semiconductor devices have been developed and sold in a great quantity in the market. VTRs and personal computers in addition to TV receivers are now in wide use by the general public and have become commonplace. Among these devices and appliances, LCD devices are a target of attention as a type of display device having advantages of lightness and low power consumption. Active matrix LCD devices including TFTs respectively connected to a plurality of pixels for controlling the pixels receive special attention as providing superior resolution and clear images.

One type of conventional active device is a TFT including an amorphous silicon thin film. Many types of active matrix LCD devices including such a type of TFTs have been developed into products. Today, as an active device for driving a pixel electrode, a TFT including a polycrystalline silicon thin film, which can be formed on the same substrate with a circuit for driving the TFT, is expected to be a positive replacement for the amorphous silicon TFT. A technology for forming such a polycrystalline silicon TFT is now being actively studied.

A polycrystalline silicon thin film has a higher mobility than an amorphous silicon used in the conventional TFTs and thus provides higher performance when used in a TFT. TFTs for driving a pixel electrode which are formed on the same substrate integrally with a circuit for driving the TFTs will significantly reduce the production cost.

Technologies now proposed for forming a polycrystalline silicon thin film used as an active layer of the polycrystalline silicon TFT on a glass substrate include a solid phase growth method and a laser crystallization method. According to the solid phase growth method, amorphous silicon is deposited on a glass substrate and then crystallized by heat-treatment performed at a temperature of about 600° C. for several to several tens of hours. According to the laser crystallization method, amorphous silicon is melted and thus recrystallized instantaneously by irradiation with a pulse laser such as excimer laser.

A plurality of pixel electrodes are respectively connected to drains of TFTs and are spaced apart by a prescribed distance from gate lines and source lines adjacent to the pixel electrodes. As a structure of the pixel electrodes and elements disposed in the vicinity thereof, a pixel-on-passivation structure shown in FIG. 15 has been proposed. The pixel-on-passivation structure includes a substrate 51 including the TFT, an interlayer insulating layer 58 formed of a polyimide resin or an acrylic resin, and a pixel electrode 64 provided on the interlayer insulating layer 58. A drain electrode 61 of the TFT is connected to the pixel electrode 64 through a contact hole 63 formed in the interlayer insulating layer 58. Reference numeral 62 represents a source electrode of the TFT.

According to such a structure, the pixel electrode 64 is insulated from the gate lines and source lines by the interlayer insulating layer 58 formed of a polyimide resin or an acrylic resin. This arrangement allows for the pixel electrode 64 to be provided so that ends of the pixel electrode 64 overlap the gate lines and source lines. Thus, the effective area of the pixel electrode 64, i.e., the numerical aperture, is increased. Moreover, the interlayer insulating layer 58 compensates for the stepped surface caused by the TFTs, gate lines and source lines and provides a flat surface. Such a flat surface has an effect of minimizing the disturbance of alignment of liquid crystal molecules 60.

Active matrix LCD devices having such a structure are mainly classified into a transmission-type LCD devices in which the pixel electrodes are formed of ITO (indium tin oxide) and reflection-type LCD devices in which the pixel electrodes are formed of a reflective material such as a metal material. Since the LCD devices do not include a light source therein, the transmission-type LCD devices use a lighting device, i.e., a so-called backlight disposed behind the LCD devices to perform display. Reflection-type LCD devices perform display by external light which is reflected by the reflection electrodes.

Transmission-type LCD devices require a high power consumption due to the use of backlight but have an advantage of realizing bright and high-contrast display regardless of the brightness of the surroundings. Reflection-type LCD devices have a drawback of the brightness and the contrast of the display being influenced by the brightness of the surroundings and environment in which they are used but have an advantage of a very low power consumption. Therefore, the reflection-type LCD devices attract attention as display devices usable for mobile information devices using a battery as a power source.

In conventional LCD devices, the reflection electrodes are generally formed of aluminum or an alloy thereof since these materials have relatively high reflectance, are easy to form into a film by sputtering or the like, and allow for high etching precision.

When aluminum is used for a mirror-surface reflection electrode having directivity with respect to an angle of incident light or a scattering surface reflection electrode having little directivity, the light utilization factor caused by reflection needs to be considered.

FIG. 13 is a graph illustrating the absolute reflectance of silver and aluminum layers and the thickness of the silver and aluminum layers. The reflectance is measured where light is incident on an Ag sample vapor-deposited at room temperature by resistance heating from above at a substantially vertical angle (angle of incidence: 12 degrees).

As shown in FIG. 13, the reflectance of aluminum is about 90% in air and about 85% in a liquid crystal layer. As can be appreciated from these results, use of aluminum for a mirror-surface reflection electrode or a scattering surface reflection electrode has a problem in that the intensity of the incident light is reduced by 10 to 15% and that the reduced intensity of light is absorbed by aluminum to cause heat generation.

In order to improve the reflectance of aluminum, a dielectric multi-layer film can be formed on the surface of the aluminum film. Such an electrode is difficult to produce due to the high precision required for the dielectric film and the need for forming a plurality of dielectric layers, thus raising the production cost. The dielectric multi-layer film is formed of an insulating material, which requires a higher voltage for driving liquid crystal molecules compared to the case in which the dielectric multi-layer film is not used.

Japanese Laid-Open Publication Nos. 56-57086 and 57-120977, for example, propose use of silver which has a higher reflectance than aluminum, for a reflection electrode. As shown in FIG. 13, the reflectance of silver is about 5% higher than that of aluminum and thus is suitable to be used for a mirror-surface reflection electrode or a scattering surface reflection electrode.

Whereas aluminum allows for precision processing for patterning of about 2 μm or less by anisotropic etching using chlorine plasma, silver does not allow for anisotropic dry etching using halogen gas because the vapor pressure of halogenated silver of AgCl (silver chloride), AgF (silver fluoride) and the like is excessively low. Accordingly, the precision processing technology by dry etching of silver has not been established. Silver is mostly patterned by wet etching using a nitric acid etchant. With wet etching, i.e., isotropic etching, it is difficult to realize processing as precise as is possible with aluminum.

In formation of LCD devices, precision processing is very important for forming signal lines and reflection electrodes. As the area of one pixel area becomes smaller along with reduced size and higher precision of the LCD devices, the width of the signal lines and the size of inter-reflection electrode spaces have a significant effect on the numerical aperture of the LCD devices. Use of silver for the reflection electrodes, which requires a larger size of inter-reflection electrode spaces in order to compensate for size shifting due to over-wet etching, has a problem in that the numerical aperture is reduced.

SUMMARY OF THE INVENTION

According to one aspect of the invention, a reflection-type liquid crystal display device includes a first substrate including a plurality of pixel electrodes arranged in a matrix and switching devices for driving the pixel electrodes; a second substrate including a counter electrode; and a liquid crystal layer interposed between the first substrate and the second substrate. The pixel electrodes each include a lower electrode layer and an upper electrode layer. The upper electrode layer is formed of either silver or a silver alloy and is reflective.

In one embodiment of the invention, the upper electrode layer has a mirror surface and preferably a thickness of about 100 nm to about 200 nm or 500 nm or more. The upper electrode layer may also have a scattering surface.

The lower electrode layer preferably has a first layer formed of one material selected from the group consisting of an electric conductive oxide, Cr, Fe, Ni, Co and Cu, and the upper electrode layer is provided on the first layer.

A second layer of the lower electrode may be formed of a metal material, with the first layer formed of an electric conductive oxide and provided on the second layer.

The reflection-type liquid crystal display device may further include a gold strike-plate layer between the lower electrode layer and the upper electrode layer.

A resin insulating layer may also be included for providing a substantially flat surface, with the lower electrode layer, preferably having a flat surface provided on the resin insulating layer and connected to the respective switching device through a contact hole formed in the resin insulating layer.

According to another aspect of the invention, a method for producing a reflection-type liquid crystal display device including a first substrate including a plurality of pixel electrodes arranged in a matrix and switching devices for driving the pixel electrodes, a second substrate including a counter electrode, and a liquid crystal layer interposed between the first substrate and the second substrate is provided. The method includes the step of forming the pixel electrodes connected to the switching devices. The step of forming the pixel electrodes includes the steps of forming a lower electrode layer; and forming an upper electrode layer of either silver or a silver alloy selectively on a surface of the lower electrode layer by plating while controlling the upper electrode layer to have a thickness so that the upper electrode layer has a prescribed reflection characteristic.

In one embodiment of the invention, the step of forming the lower electrode layer includes the step of forming a first layer of one material selected from the group consisting of an electric conductive oxide, Cr, Fe, Ni, Co and Cu, and the step of forming the upper (electrode layer includes the step of forming the upper electrode layer on the first layer.

The step of forming the lower electrode layer, which preferably has a substantially flat surface, may include the steps of forming a first layer of an electric conductive oxide; forming a second layer of a metal material; and locating the first layer on the second layer.

The step of forming the pixel electrodes preferably further includes the step of performing pre-processing of the lower electrode layer after the formation of the lower electrode layer so as to improve an adhesiveness of the lower electrode layer with the upper electrode layer.

The upper electrode layer may be formed to a thickness of about 100 nm to about 200 nm so that the upper electrode layer has a mirror surface or to a thickness of about 500 nm or more so that the upper electrode layer has a scattering surface.

According to still another aspect of the invention, a reflection-type liquid crystal display device includes a first substrate; a second substrate; and a liquid crystal layer interposed between the first substrate and the second substrate. The first substrate and the second substrate respectively include a first electrode and a second electrode for applying a voltage to the liquid crystal layer. The first electrode includes a lower electrode layer and an upper electrode layer covering a surface of the lower electrode layer. The upper electrode layer is formed of either silver or a silver alloy and is reflective.

In one embodiment of the invention, the lower electrode layer includes a first layer formed of one material selected from the group consisting of an electric conductive oxide, Cr, Fe, Ni, Co and Cu, and the upper electrode layer is provided on the first layer.

According to yet another aspect of the invention, a method for producing a reflection-type liquid crystal display device including a first substrate having a first electrode; a second substrate having a second electrode; and a liquid crystal layer interposed between the first substrate and the second substrate is provided. The method includes the step of forming the first electrode, which includes the steps of forming a lower electrode layer; and forming an upper electrode layer of either silver or a silver alloy selectively on a surface of the lower electrode layer by plating while controlling the upper electrode layer to have a thickness so that the upper electrode layer has a prescribed reflection characteristic.

In one embodiment of the invention, the step of forming the lower electrode layer includes the steps of forming a first layer of one material selected from the group consisting of an electric conductive oxide, Cr, Fe, Ni, Co and Cu, and the step of forming the upper electrode layer includes the step of forming the upper electrode layer on the first layer.

A reflection-type liquid crystal display device and a method for producing the same according to the present invention have the following functions and effects.

Each of the plurality of pixel electrodes includes a lower electrode layer and an upper electrode layer covering a surface of the lower electrode layer, and the upper electrode layer is formed of silver or a silver alloy. Accordingly, the upper electrode layer has a sufficiently high reflectance. Thus, the reflection-type liquid crystal display device provides improved brightness.

In the case where the upper electrode layer has a thickness of about 100 nm to about 200 nm, the upper electrode has a mirror surface.

In the case where the upper electrode layer has a mirror surface, the light from the light source is reflected with a maximum efficiency. When used in a pixel electrode of a projection-type liquid crystal display device, such an upper electrode layer acts as an effective reflection electrode layer. The reflection-type liquid crystal display device including such an upper electrode layer provides improved brightness.

In the case where the upper electrode layer has a thickness of about 500 nm or more, the upper electrode has a scattering surface.

In the case where the upper electrode layer has a scattering surface, the light from the light source is scattered with a satisfactory efficiency. Thus, a bright and highly visually recognizable display is obtained. When used in a pixel electrode of a direct-view reflection-type liquid crystal display device by which images are directly viewed, such an upper electrode layer acts as an effective reflection electrode layer. The reflection-type liquid crystal display device including such an upper electrode layer provides improved brightness.

In the case where the lower electrode layer has a first layer formed of one material selected from the group consisting of an electric conductive oxide, Cr, Fe, Ni, Co and Cu, a surface of which is unlikely to change, the lower electrode layer is plated with an upper electrode layer in stable conditions, resulting in a satisfactory adhesiveness between the lower electrode layer and the upper electrode layer. In the case where the lower electrode layer is formed of ITO, which is an electric conductive oxide, a conventional method for producing a transmission-type liquid crystal display device is usable up to the step of etching ITO.

In the case where the lower electrode layer further has a second layer formed of a metal material, and the first layer is formed of an electric conductive oxide and provided on the second layer, the lower electrode layer includes at least two layers, and thus the upper electrode layer is formed stably. Especially in the case where the first layer of the lower electrode layer is formed of ITO or any other electric conductive oxide having a relatively high resistance and the second layer of the lower electrode layer formed below the first layer is formed of a metal material having a relatively low resistance, a satisfactory conductivity is guaranteed. Thus, the plating stability is improved.

In the case where a gold strike-plate layer is formed between the lower electrode layer and the upper electrode layer, the adhesiveness between the lower electrode layer and the upper electrode layer is improved.

In the case where the reflection-type liquid crystal display device further includes a resin insulating layer for providing a flat surface, and the lower electrode layer is provided on the resin insulating layer and connected to the switching device through a contact hole formed in the resin insulating layer, a surface of the lower electrode layer and a surface of the upper electrode layer covering the surface of the lower electrode layer are flattened. Thus, the upper electrode has a high reflectance. When used in a projection-type liquid crystal display device, such an upper electrode provides satisfactory reflection characteristics. When the resin insulating layer has an uneven surface with bumps and depressions or a wave- or ripple-surface due to the non-uniform thickness, the upper electrode layer provided above the resin insulating layer and acting as a scattering surface reflection electrode is unlikely to obtain uniform scattering characteristics. Application of a resin is performed by a simple method for compensating the stepped surface and improving the flatness of the surface, and a substantial flatness can be achieved by selecting an appropriate resin.

When the surface of the lower electrode layer is substantially flat, the surface of the upper electrode layer covering the lower electrode layer is also substantially flat. When the upper electrode layer is used as the mirror-surface reflection electrode, the collimated incident light is reflected by the mirror surface at a maximum efficiency in a prescribed direction. When the upper electrode layer is used as the scattering surface reflection electrode, uniform scattering characteristics are obtained.

According to the present invention, the step of forming the pixel electrodes includes the steps of forming a lower electrode layer; and forming an upper electrode layer of silver or a silver alloy selectively on a surface of the lower electrode layer by plating while controlling the upper electrode layer to have a thickness so that the upper electrode layer has a prescribed reflection characteristic. The upper electrode layer having a mirror surface having a sufficiently high reflectance or a scattering surface having satisfactory scattering characteristics is formed relatively easily.

In the case where the step of forming the lower electrode layer has the step of forming a first layer formed of one material selected from the group consisting of an electric conductive oxide, Cr, Fe, Ni, Co and Cu, the lower electrode layer is plated with an upper electrode layer in stable conditions, resulting in a satisfactory adhesiveness between the lower electrode layer and the upper electrode layer.

In the case where the step of forming the lower electrode layer includes the steps of forming a second layer of a metal material and forming the first layer of an electric conductive oxide and provided on the second layer, the lower electrode layer includes at least two layers and thus the upper electrode layer is formed stably. Especially in the case where the first layer of the lower electrode layer is formed of ITO or any other electric conductive oxide having a relatively high resistance and the second layer of the lower electrode layer formed below the first layer is formed of a metal material having a relatively low resistance, a satisfactory conductivity is guaranteed. Thus, the plating stability is improved.

In the case where the step of forming the pixel electrode further includes the step of performing preprocessing of the lower electrode layer after the formation of the lower electrode layer, the adhesiveness between the lower electrode layer and the upper electrode layer is improved.

In the case where the step of forming the upper electrode layer includes the step of forming the upper electrode layer to a thickness of about 100 nm to about 200 nm, the upper electrode has a mirror surface. In the case where the upper electrode layer has a thickness of about 500 nm or more, the upper electrode has a scattering surface. The surface of the upper electrode layer is changed from a mirror surface to a scattering surface by controlling the thickness of a silver or a silver alloy formed by gradually increasing the amount of deposition. As the deposited silver grows, very tiny bumps and depressions generated by the silver crystal grains are also increased. Utilizing such a phenomenon, the degree of reflection or scattering is varied by the thickness of the layer formed by deposition. The thickness is adjusted by controlling the current density and the length of time of plating.

The upper electrode layer formed of silver or a silver alloy preferably has a thickness of about 70 nm or more in order to obtain a greater reflectance than that of an aluminum layer in the range of visible light having a wavelength of 400 nm to 700 nm.

In the case where the step of forming the lower electrode layer includes the step of forming the lower electrode layer so as to have a substantially flat surface, the reflective upper electrode is also formed to have a flat surface. When used as the mirror-surface reflection electrode, the upper electrode layer reflects the collimated incident light with a maximum efficiency in a prescribed direction. When used as the scattering surface reflection electrode also, the upper electrode layer has uniform scattering characteristics. Unless the lower electrode layer has a flat surface, the surface of the upper electrode provided on the lower electrode layer is not likely to have uniform scattering characteristics.

Thus, the invention described herein makes possible the advantages of providing a reflection LCD device including a mirror-surface or scattering surface reflection electrode formed by easy precise processing and a method for producing the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
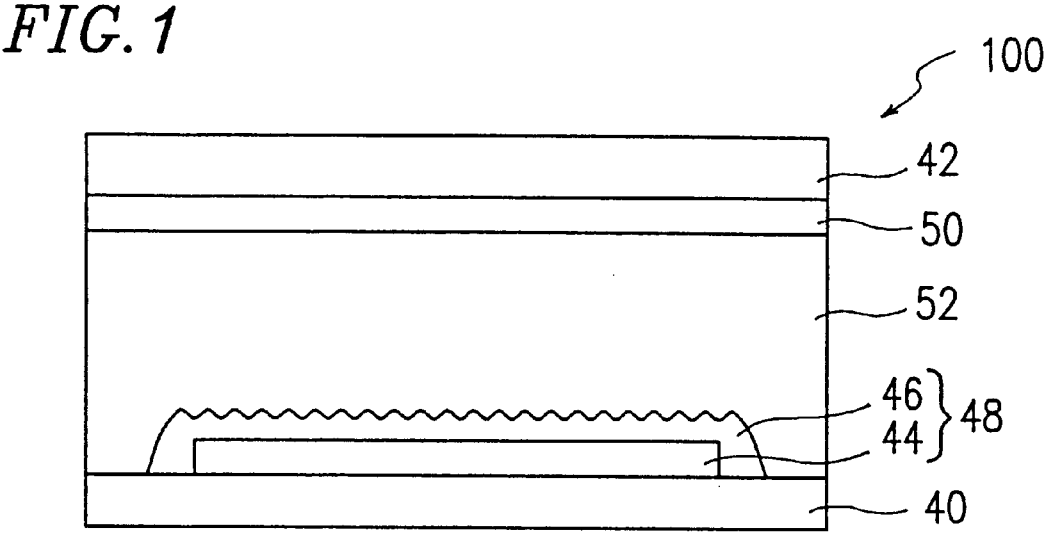
FIG. 1 is a cross-sectional view of a reflection-type LCD device according to the present invention.

FIG. 1 is a schematic cross-sectional view of an LCD device 100 in an example according to the present invention. The LCD device 100 includes a first substrate 40, a second substrate 42, a liquid crystal layer 52 interposed between the first and second substrates 40 and 42, a first electrode 48, and a second electrode 50. The first and second electrodes 48 and 50 are provided for applying a voltage to the liquid crystal layer 52. The first electrode 48 includes a lower electrode layer 44 and an upper electrode layer 46 covering a surface of the lower electrode layer 44. The upper electrode layer 46 is formed of silver or a silver alloy and is reflective.

In the case where the LCD device 100 is used as an active matrix LCD device, the first electrode 48 is used as a pixel electrode and the second electrode 50 is used as a counter electrode. In the case where the LCD device 100 is used as a simple matrix LCD device, one of the first electrode 48 and the second electrode 50 is used as a scanning electrode and the other is used as a signal electrode.

The first electrode 48 is formed by first forming the lower electrode layer 44 and then forming the upper electrode layer 46 of silver or a silver alloy selectively on a surface of the lower electrode layer 44 by plating. The thickness of the upper electrode layer 46 is controlled so that a surface of the upper electrode layer 46 has a prescribed reflection characteristic.

In accordance to such a principle, a reflection-type LCD device including a highly reflective and highly precise mirror-surface or scattering surface reflection electrode is produced by a simple production method.

Although active matrix LCD devices will be described in the following example, the present invention is not limited to active matrix LCD devices and is applicable to simple matrix LCD devices.

EXAMPLE 1

Figure 2:
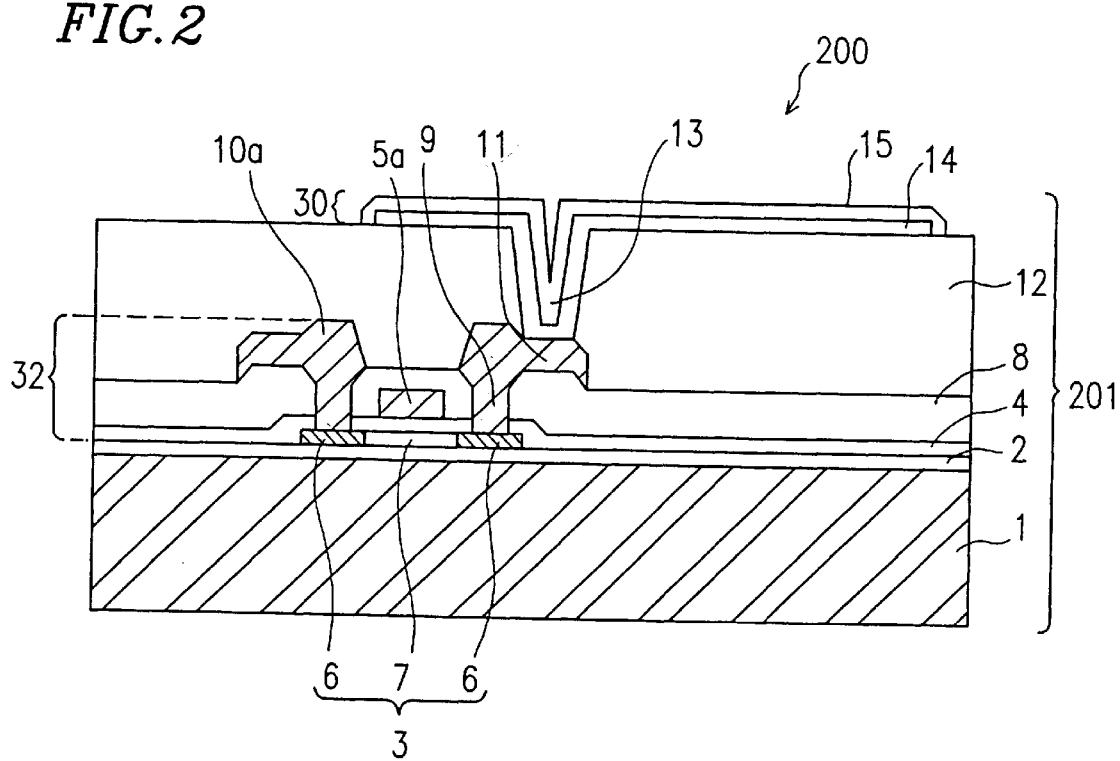
FIG. 2 is a partial cross-sectional view of a reflection-type LCD device in a first example according to the present invention.
Figure 3:
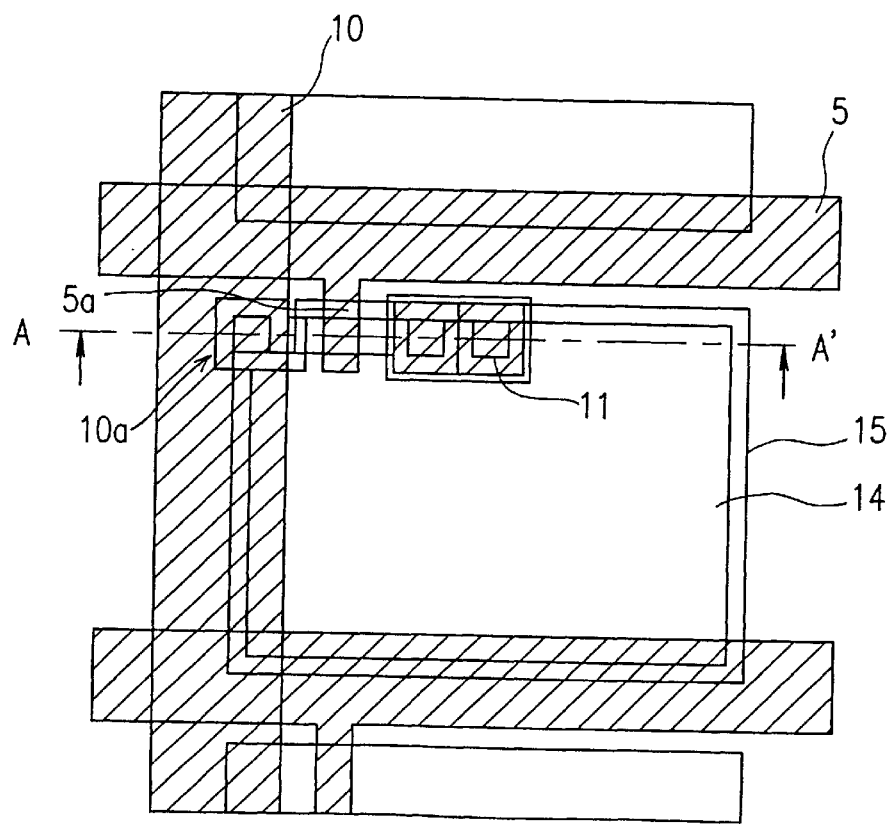
FIG. 3 is a partial plan view of the reflection-type LCD device shown in FIG. 2.

FIG. 2 is a partial cross-sectional view of a reflection-type LCD device 200 in a first example according to the present invention. FIG. 3 is a partial plan view of the reflection-type LCD device 200. The cross-sectional view of FIG. 2 is taken along line A–A' of FIG. 3. FIGS. 4A, 4B, 5A and 5B show production steps of the reflection-type LCD device 200 shown in FIGS. 2 and 3. For simplicity, the following description will be given regarding one pixel area of the reflection-type LCD device 200.

As shown in FIG. 2, the reflection-type LCD device 200 includes an active matrix substrate 201, a counter substrate (second substrate; not shown), and a liquid crystal layer (not shown). The active matrix substrate 201 includes an insulating plate 1 formed of glass or the like, a pixel electrode 30, and a TFT 32 provided as a switching device for driving the pixel electrode 30. The counter substrate includes a counter electrode (not shown). The pixel electrode 30 includes a lower electrode layer 14 and an upper electrode layer 15 covering a surface of the lower electrode layer 14.

The upper electrode layer 15 is formed of silver or a silver alloy and is reflective.

The active matrix substrate 201 further includes a base coat layer 2 formed of $SiO_2$ or the like provided on the insulating plate 1. The TFT 32 is provided on the base coat layer 2. The TFT 32 includes a semiconductor layer 3 formed of a silicon thin film or the like and provided on the insulating plate 1; a gate insulating layer 4 formed of $SiO_2$ or the like and provided on the base coat layer 2 so as to cover the semiconductor layer 3; a gate electrode 5a formed of a metal material such as, for example, aluminum and branched from a gate line 5 (FIG. 3); a source electrode 10a as a part of a source line 10 (FIG. 3); and a drain electrode 11. The gate electrode 5a is formed to have a prescribed shape. An interlayer insulating layer 8 is provided on the entire surface of the gate insulating layer 4 so as to cover the gate electrode 5a.

The semiconductor layer 3 includes source and drain regions 6 containing impurity ions implanted thereto and a channel region 7 containing no impurity ions. The channel region 7 is provided below the gate electrode 5a. The interlayer insulating layer 8 and the gate insulating layer 4 have contact holes 9 formed therethrough. The contact holes 9 reach the source and drain regions 6, and the source electrode 10a and the drain electrode 11 are respectively electrically connected to the source region 6 and the drain region 6 through the contact holes 9.

The active matrix substrate 201 further includes a resin insulating layer 12 provided so as to cover the interlayer insulating layer 8, the source electrode 10a, and the drain electrode 11. The resin insulating layer 12 has a contact hole 13 formed therethrough. The lower electrode layer 14 of the pixel electrode 30 is electrically connected to the drain electrode 11 through the contact hole 13.

With reference to FIGS. 4A, 4B, 5A and 5B, a method for producing the reflection-type LCD device 200 will be described.

Figure 4A:
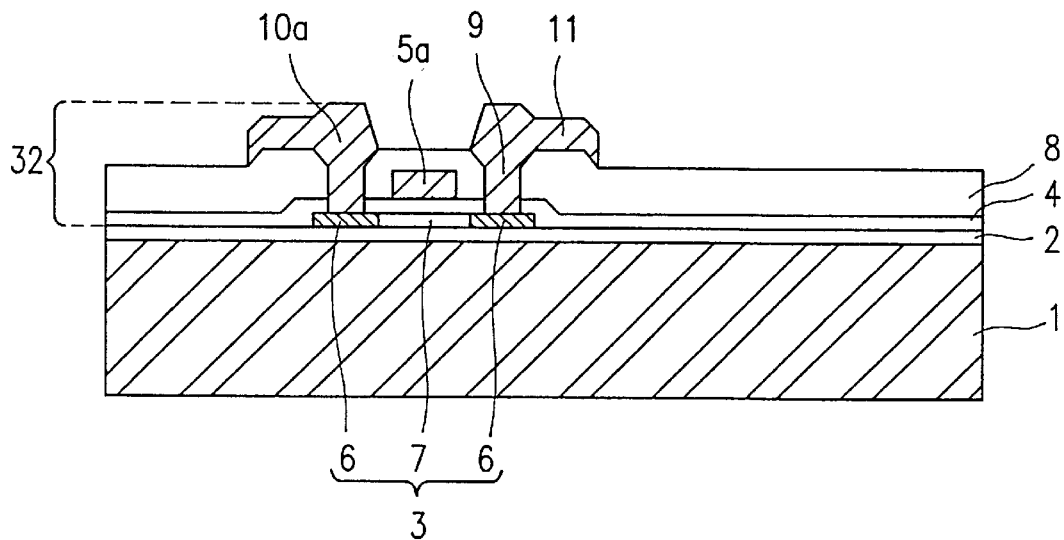
FIGS. 4A, 4B, 5A and 5B are cross-sectional views illustrating production steps of the reflection-type LCD device in the first example according to the present invention.

The TFT 32 and elements in the vicinity thereof are formed on the insulating plate 1 formed of glass or the like as shown in FIG. 4A as conventionally known.

$SiO_2$ or the like is deposited on the insulating plate 1 by sputtering or plasma CVD to form the base coat layer 2. Then, silicon such as, for example, polycrystalline silicon or amorphous silicon, is deposited on the base coat layer 2 to a thickness of, for example, about 30 nm to about 100 nm. When amorphous silicon is deposited, the resultant amorphous silicon layer is irradiated with laser light from above to be polycrystallized. The above-polycrystallized silicon layer or the polycrystalline silicon layer is patterned into a prescribed pattern and used as the semiconductor layer 3.

$SiO_2$ or any suitable other insulating material is deposited on the base coat layer 2 so as to cover the semiconductor layer 3 to a thickness of, for example, about 100 nm, to form the gate insulating layer 4. The gate electrode 5a of a metal material such as, for example, aluminum is formed on the gate insulating layer 4 so as to overlap the semiconductor layer 3 in a prescribed shape.

Impurity ions are implanted into the semiconductor layer 3 using the gate electrode 5a as a mask, and heat-treatment is performed in order to activate the implanted impurity ions. Thus, the source and drain regions 6 are formed. Simultaneously, the channel region 7 containing no impurity ions is formed below the gate electrode 5a.

$SiO_2$, $SiN_x$ or the like is deposited on the entire surface of the gate insulating layer 4 so as to cover the gate electrode 5a, thereby forming the interlayer insulating layer 8. The contact holes 9 are formed through the interlayer insulating layer 8 and the gate insulating layer 4 so as to reach the source and drain regions 6. Then, the source electrode 10a and the drain electrode 11 both of a metal material such as, for example, aluminum, are formed so as to be respectively electrically connected to the source and drain regions 6 through the contact holes 9.

Thus, the TFT 32 and the elements in the vicinity thereof are formed.

The present invention is applicable to a coplanar TFT in which the semiconductor layer 3 is formed of polycrystalline silicon, a TFT in which the semiconductor layer 3 is amorphous silicon, or an inverted staggered-type TFT. The switching devices can be MIMs (metal insulator metal) or TFDs (thin film diode) in lieu of TFTs.

Figure 4B:
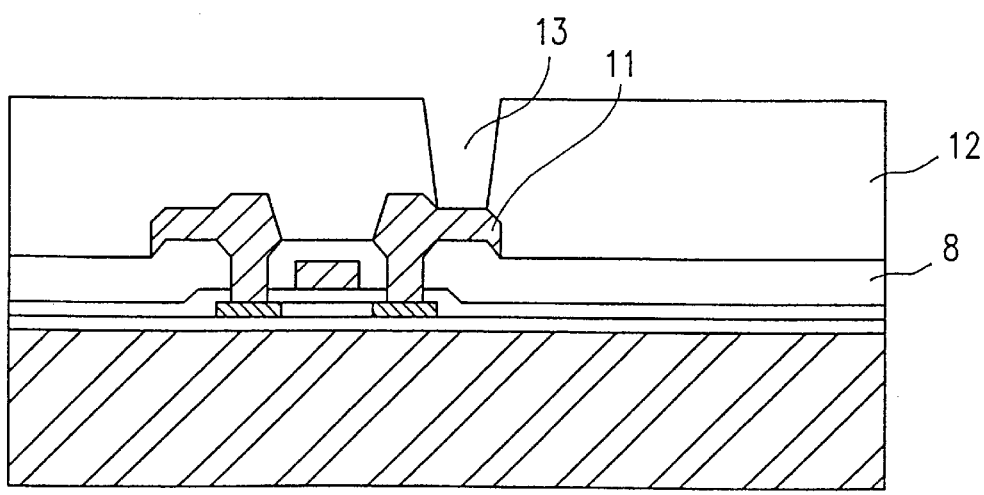

After the TFT 32 is formed, the resin insulating layer 12 is formed, as shown in FIG. 4B, by applying a polyimide resin or an acrylic resin to the entire surface of the TFT 32 and the interlayer insulating layer 8.

When collimated light needs to be reflected in a prescribed direction efficiently as in, for example, projection-type LCD devices, the resin insulating layer 12 preferably has a substantially flat surface. The reason is that the reflection electrode needs to have a flat surface in order to reflect incident light at a maximum efficiency. Application of a resin is performed by a simple method for improving the flatness of the surface, and a substantial flatness can be achieved by selecting an appropriate resin. Chemical and mechanical polishing is also usable in order to achieve a higher flatness, but this method has disadvantages in that it is difficult to uniformly polish the entire surface of a large substrate and that the production cost is raised.

In this example, the resin insulating layer 12 is formed of Optomer SS (produced by Japan Synthetic Rubber Co., Ltd.). The resin insulating layer 12 preferably has a thickness of about 2 µm to 4 µm. In this example, the resin insulating layer 12 is formed to have a maximum thickness of about 2 µm.

Then, the contact hole 13 is formed in the resin insulating layer 12 so as to reach the drain electrode 11. The contact hole 13 can be formed by dry etching using oxygen gas. In this example, dry etching is performed under the conditions of the oxygen gas flow rate of 400 sccm, the high frequency power of 600 W and the gas pressure of 200 mTorr. In the case where the resin insulating layer 12 is formed of a light-sensitive material, the step of forming the contact hole 13 is simplified.

Figure 5A:
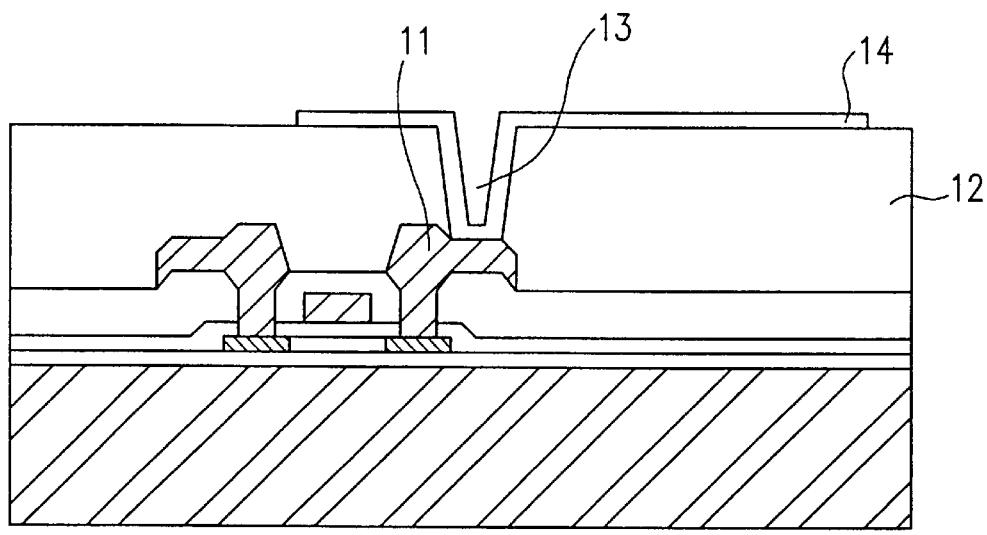

Next, as shown in FIG. 5A, a transparent and electric conductive material such as, for example, ITO or $SnO_2$ or a metal material such as, for example, Cr, Fe, Ni, Co or Cu, is deposited on the resin insulating layer 12 so as to cover a surface of the contact hole 13, and patterned by sputtering or photoresist using a mask, thereby forming the lower electrode layer 14. Thus, the lower electrode layer 14 is electrically connected to the drain electrode 11.

The lower electrode layer 14 can be formed of an electric conductive oxide such as, for example, ITO or $SnO_2$. The state of the surface of many metal materials changes as a result of an insulating oxide film being formed thereon. An electric conductive oxide such as ITO or $SnO_2$ is not likely to generate such a phenomenon and thus always guarantees satisfactory conductivity.

The lower electrode layer 14 can alternatively be formed of a metal material such as, for example, Cr, Fe, Ni, Co or Cu. The surface of these metal materials is unlikely to be oxidized and also provides a satisfactory adhesiveness when being plated. Accordingly, use of such a metal material for the lower electrode layer 14 facilitates formation of the upper electrode layer 15 on the lower electrode layer 14. These metal materials are relatively easy to deposit by well-known methods such as, for example, sputtering, and also allow for precise patterning of about 2 μm to 3 μm by wet etching or dry etching. Accordingly, when the lower electrode layer 14 formed of such a metal material is plated, the silver plating layer (i.e., upper electrode layer 15) is formed in a self-aligning manner on the lower electrode layer 14. This eliminates the necessity of etching of silver, and thus the precise patterning of the lower electrode layer 14 is transmitted to the upper electrode layer 15.

Figure 6:
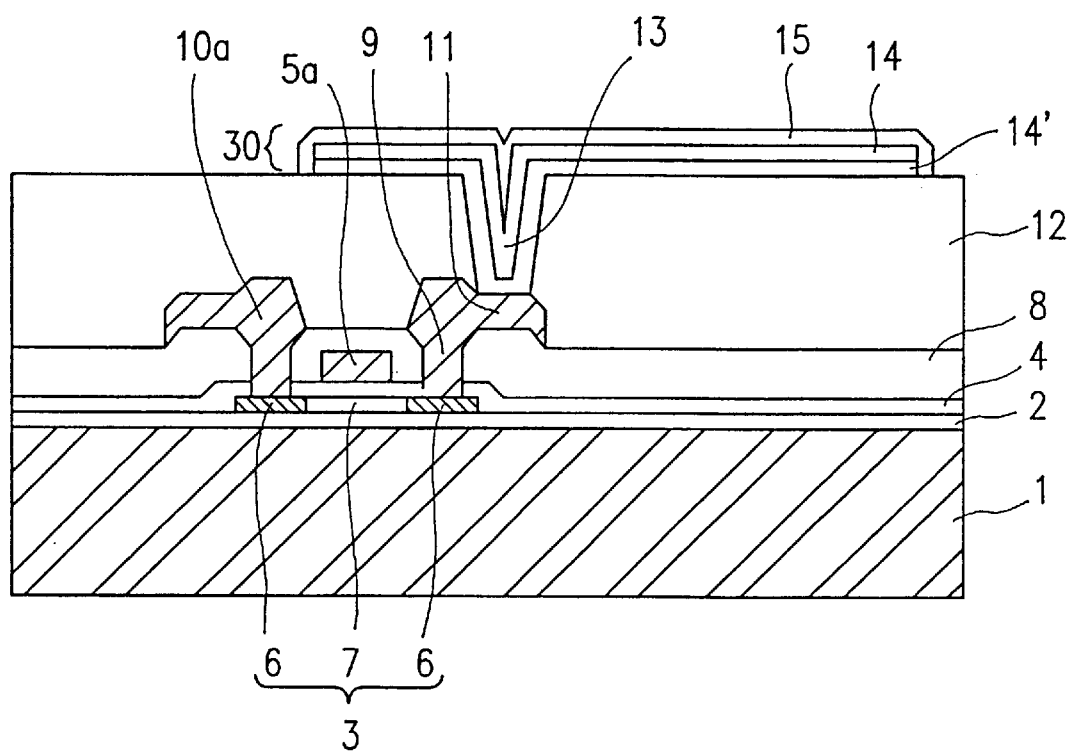
FIG. 6 is a cross-sectional view of an alternative reflection-type LCD device in the first example according to the present invention.

As shown in FIG. 6, in the case where the lower electrode layer 14 (first layer) is formed of ITO or $SnO_2$, an electrode layer 14' (second layer) formed of a metal material can be provided below the lower electrode layer 14. Since ITO or $SnO_2$ has a higher resistance than metal materials, uniform plating on the lower electrode layer 14 may not be performed under certain conditions, for example, when the surface area of the electrode is excessively large. Accordingly, it is very effective for facilitating the plating to provide the electrode layer 14' formed of a metal material having a lower resistance below the lower electrode layer 14 formed of ITO or $SnO_2$.

Figure 5B:
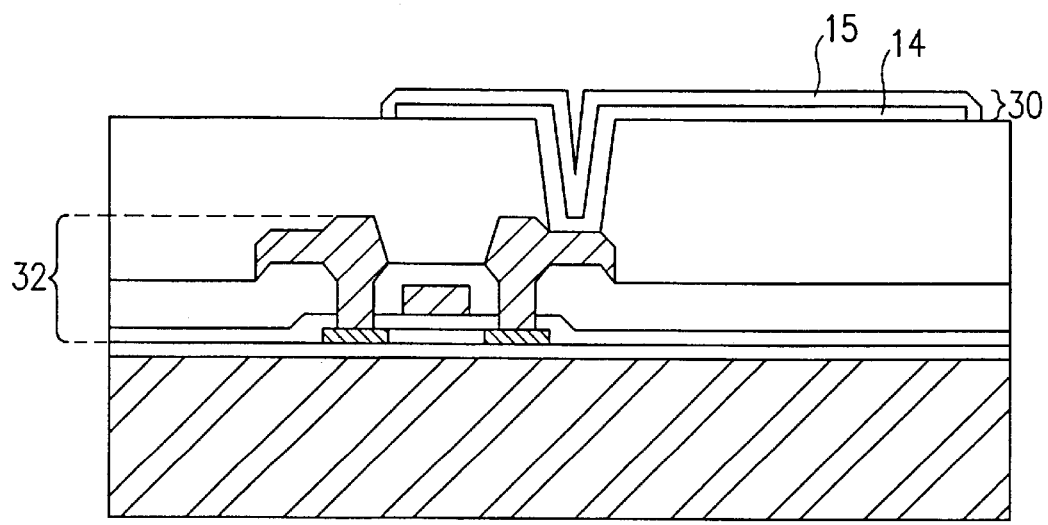

As shown in FIG. 5B, after the lower electrode layer 14 is formed, the lower electrode layer 14 is plated with silver, thereby forming the upper electrode layer 15.

Figure 12:
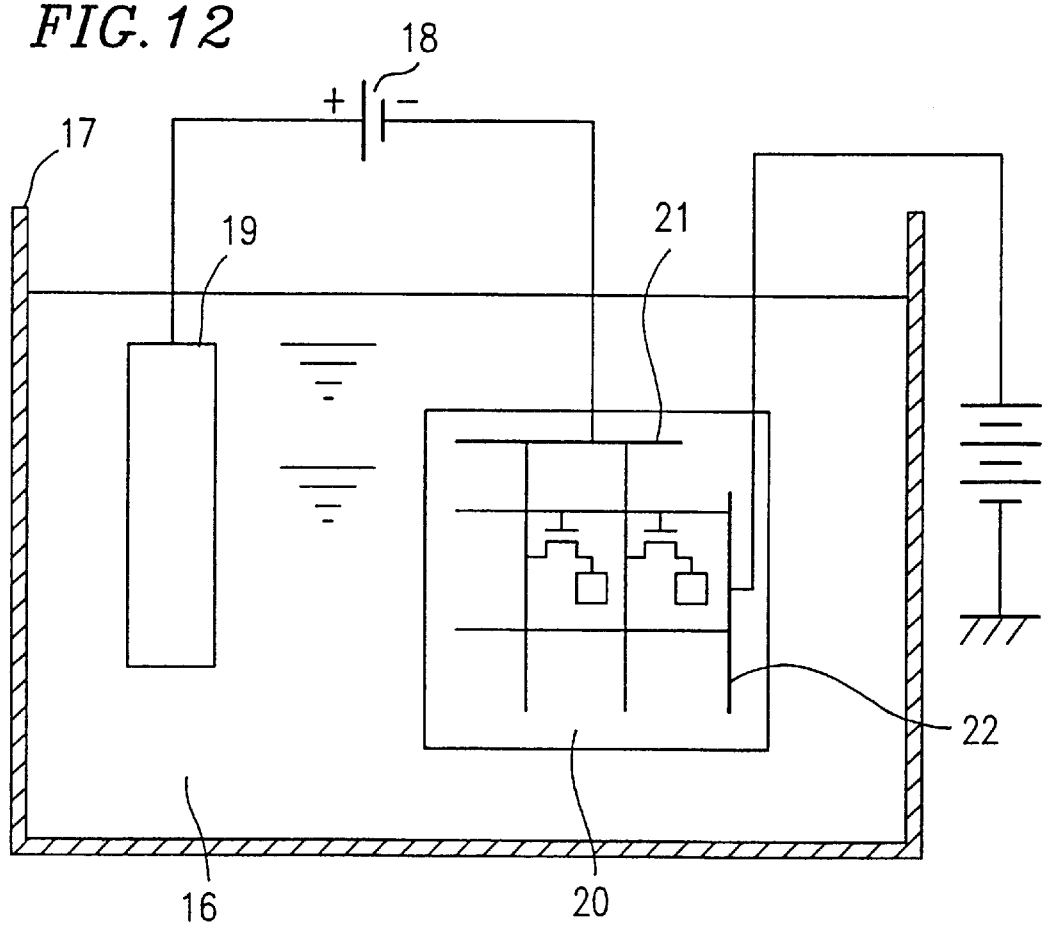
FIG. 12 is a schematic view of an apparatus used for electroplating.

In this specification, the term "plating" refers to electroplating and excludes non-electroplating (i.e., chemical plating). According to electroplating, a DC current is caused to flow in an aqueous solution including ions of a metal material with which plating is to be formed, and a metal layer is obtained on a surface of the negative electrode. FIG. 12 shows an apparatus usable for electroplating. As shown in FIG. 12, electroplating requires a plating solution 16, a plating bath 17, and a DC power source 18. Generally, a positive electrode 19 is formed of the same metal material as the metal material with which a surface is to be plated.

Plating is performed by causing a current to flow between a source common electrode 21 of an active matrix substrate 20 and the positive electrode 19. In order to plate the lower electrode layer 14 (FIG. 2) electrically connected to the drain electrode 11, the TFT 32 (FIG. 2) needs to be turned ON, which requires a voltage to be applied to a gate common electrode 22. Regarding electroplating, the laminate before the upper electrode layer 15 is formed is referred to as the "active matrix substrate 20" for convenience in description.

In this example, electroplating is performed after the active matrix substrate 20 is washed by pure water. As a plating solution, Silblex 50 (produced by Nihon Electroplating Engineers), which is a non-cyan plating solution, is used. Electroplating is performed under the conditions of the current density of 1 $A/dm^2$ and the plating solution temperature of 55° C. for about 3 minutes. The gate voltage applied to the gate common electrode 22 is set to be 10 V. After the plating, the resultant layer is washed by water and dried. As the plating solution, Silblex II, which is a cyan plating solution, is also usable.

As a result of electroplating, the upper electrode 15 having a thickness of, for example, about 100 nm is formed on the lower electrode layer 14 as shown in FIG. 5B. The upper electrode layer 15 has a reflectance of about 95%. The surface of the upper layer 15 formed of silver is a mirror surface, which is sufficient to use as a surface of the mirror-surface electrode.

According to preferable conditions for forming a silver plating layer having a thickness of about 100 nm to about 200 nm, the current density is 0.5 to 2 $A/dm^2$, the voltage to be applied to the gate electrode 22 is 10 V, the plating solution temperature is 55° C., and the plating is performed for about 30 seconds to 5 minutes. The plating period of about 30 seconds to 5 minutes is set for forming a 2.6-inch VGA (video graphics array) active matrix substrate. The plating period greatly varies in accordance with, for example, the size of the substrate and the TFT pattern in the substrate.

In this specification, a "mirror surface" and a "scattering surface" are distinguished in accordance with the angle dependency of the intensity of the reflected light with respect to the incident light. When, for example, light is incident on a sample perpendicularly and reflected light is received at a receiving angle, the intensity of the light reflected on a "mirror surface" decreases as the receiving angle increases. A "scattering surface" has little angle dependency, and the intensity of the light reflected by the scattering surface is almost constant regardless of the receiving angle.

In other words, a "mirror surface" has a conspicuous peak value in the intensity of the reflected light with respect to the incident light. A "scattering surface" does not have such a conspicuous peak value.

Figure 13:
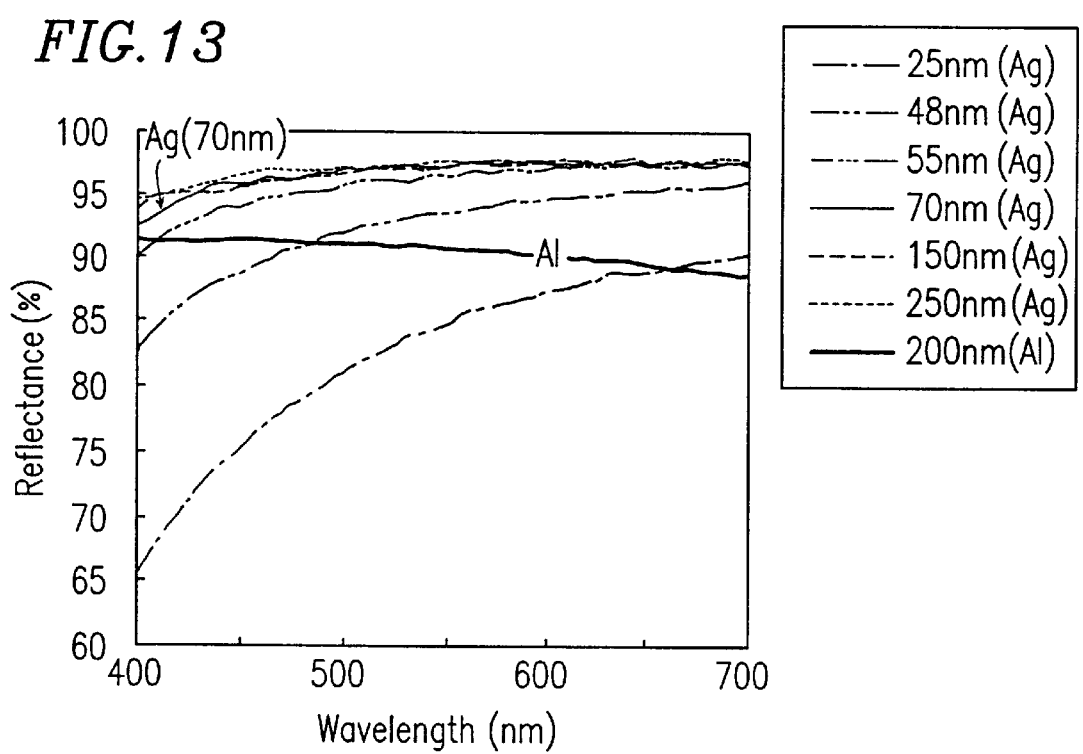
FIG. 13 is a graph illustrating the absolute reflectance of silver and aluminum layers.

For reference, as shown in FIG. 13, a silver layer needs to have a thickness of at least 70 nm in order to realize a greater reflectance than that of an aluminum layer in the range of visible light having a wavelength of 400 nm to 700 nm.

In this example, the upper electrode layer 15 is formed of silver, but a silver alloy is also usable. Preferable silver alloys include, for example, Ag—Mg and Ag—Au. In these alloys, Mg and Au are contained in a ratio of about 5% or less.

Although not shown, the following steps are formed after the upper electrode layer 15 is formed. An alignment layer is formed on the entire surface of the active matrix substrate and aligning treatment is performed. Then, the active matrix substrate is combined with a counter substrate including a counter electrode and optionally a color filter, and a liquid crystal material is injected into a gap between the active matrix substrate and the counter substrate. The reflection-type LCD device 200 (FIG. 2) produced in this manner provides a sufficiently high reflectance and also a sufficiently high light utilization factor. In the case where such a reflection-type LCD device 200 is incorporated into a projection apparatus, the brightness of resultant images is higher by about 5% compared to the brightness obtained by a conventional reflection-type LCD device including an electrode layer formed of aluminum.

The reflection-type LCD device 200 in the first example in which the upper electrode layer 15 has a mirror surface has satisfactory reflection characteristics. When such an LCD device 200 is used as a projection-type LCD device by which the images on the LCD device is projected on a screen or the like, the light from the light source is effectively utilized. Accordingly, brighter display than that by the conventional devices, with less heat generation, is realized. Such a reflection-type LCD device 200 is especially suitable for projection-type video-related appliances.

Figure 7:
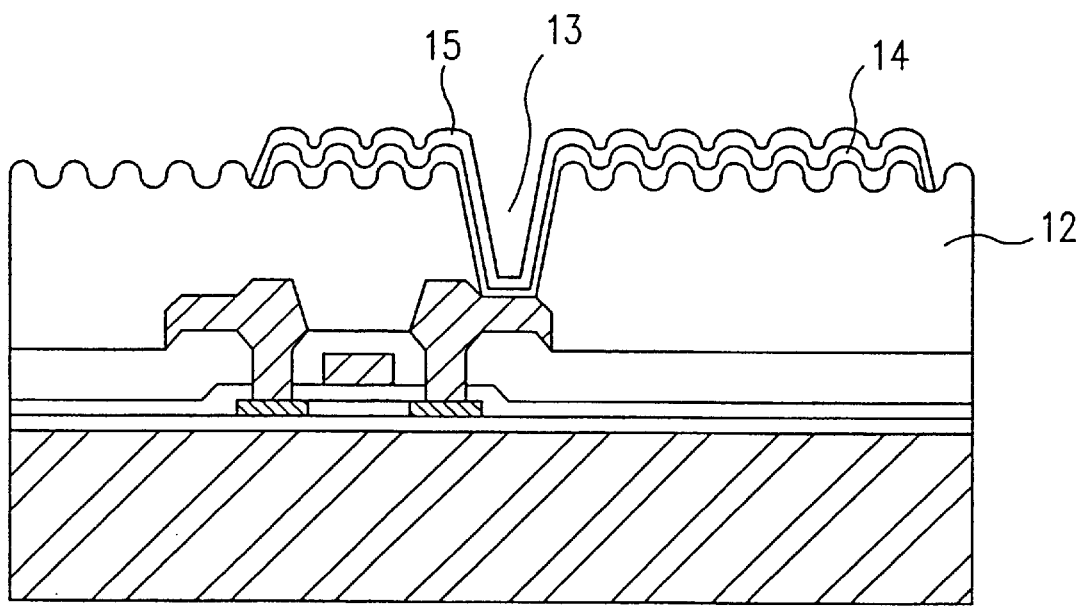
FIG. 7 is a cross-sectional view of another alternative reflection-type LCD device in the first example according to the present invention.

In the case where such a reflection-type LCD device 200 is used as a direct-view reflection-type LCD device, the upper electrode layer 15 preferably has an uneven surface with bumps and depressions as shown in FIG. 7. For example, the bumps each have a diameter of about 2 μm to 20 μm, a height of 0.1 μm to 5 μm, and a gap (distance between the centers of two adjacent bumps) of 5 μm to 50 μm. Such an uneven surface of the upper electrode layer 15 is obtained by forming the lower and upper electrode layer 14 and 15 on the resin insulating layer 12 having an uneven surface. The surface of the lower and upper electrode layer 14 and 15 is uneven in accordance with the unevenness of the surface of the resin insulating layer 12. The surface of the upper electrode layer 15 is required to be uneven in order to control the viewing angle by reflecting the incident light at an arbitrary direction. The LCD device having such a structure does not reflect the view around the LCD device in the displayed image. The uneven surface of the resin insulating layer 12 is formed by various methods including etching, and patterning an organic insulating layer into bumps and heating the bumps.

EXAMPLE 2

With reference to FIGS. 8A, 8B, 9A and 9B, a method for producing a reflection-type LCD device 300 in a second example according to the present invention will be described. FIGS. 8A, 8B, 9A and 9B show production steps of the reflection-type LCD device 300. Again for simplicity, the following description will be given regarding one pixel area of the reflection-type LCD device 300. Identical elements described with reference to FIGS. 2 through 5B will bear identical reference numerals and detailed descriptions thereof will be omitted.

Figure 8A:
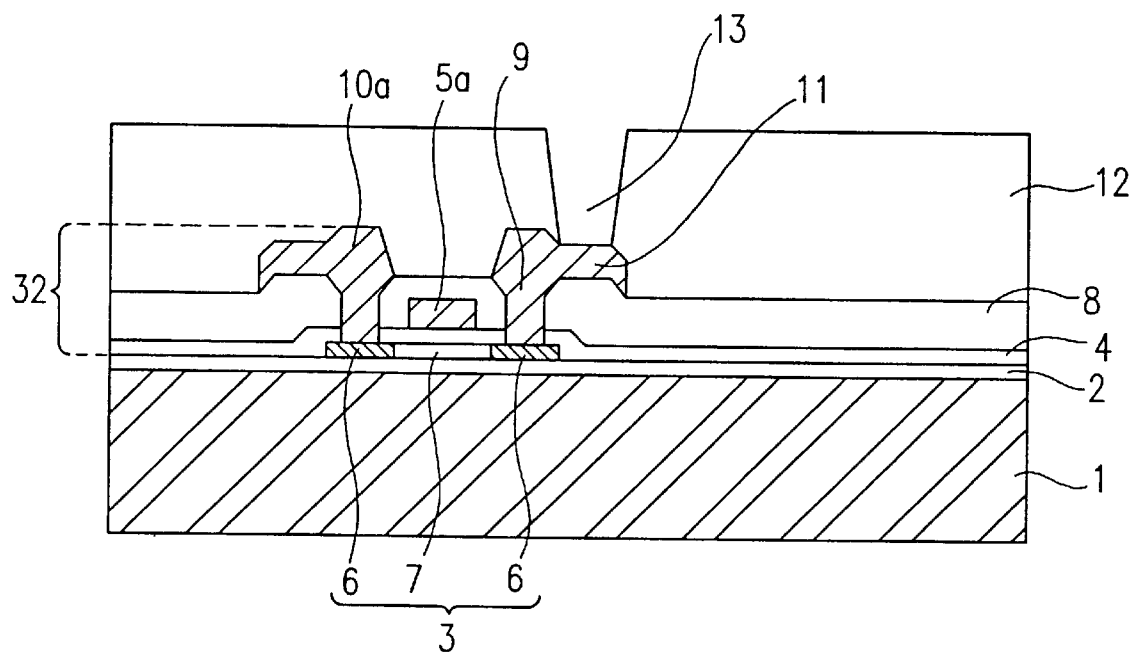
FIGS. 8A, 8B, 9A and 9B are cross-sectional views illustrating production steps of the reflection-type LCD device in a second example according to the present invention.

As shown in FIG. 8A, after the TFT 32 is formed, the resin insulating layer 12 is formed. The contact hole 13 is formed through the resin insulating layer 12. The semiconductor layer 3 of the TFT 32 can be formed of polycrystalline silicon or amorphous silicon, and the TFT 32 can be of an inverted staggered type.

Figure 8B:
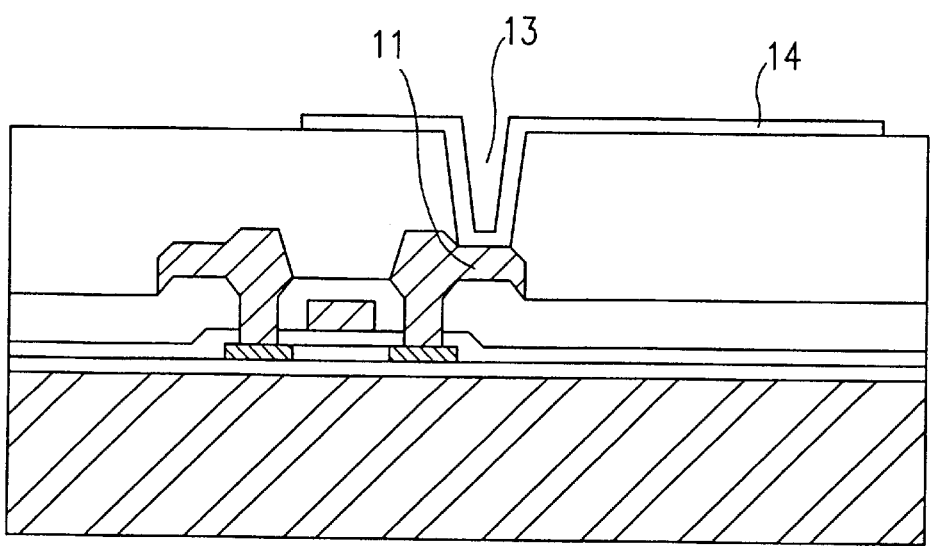

As shown in FIG. 8B, a transparent and electric conductive material such as, for example, ITO or $SnO_2$ or a metal material such as, for example, Cr, Fe, Ni, Co or Cu is deposited on the resin insulating layer 12 by sputtering or the like, thereby forming the lower electrode layer 14 so as to cover a surface of the contact layer 13. Thus, the lower electrode layer 14 is electrically connected to the drain electrode 11.

Figure 9A:
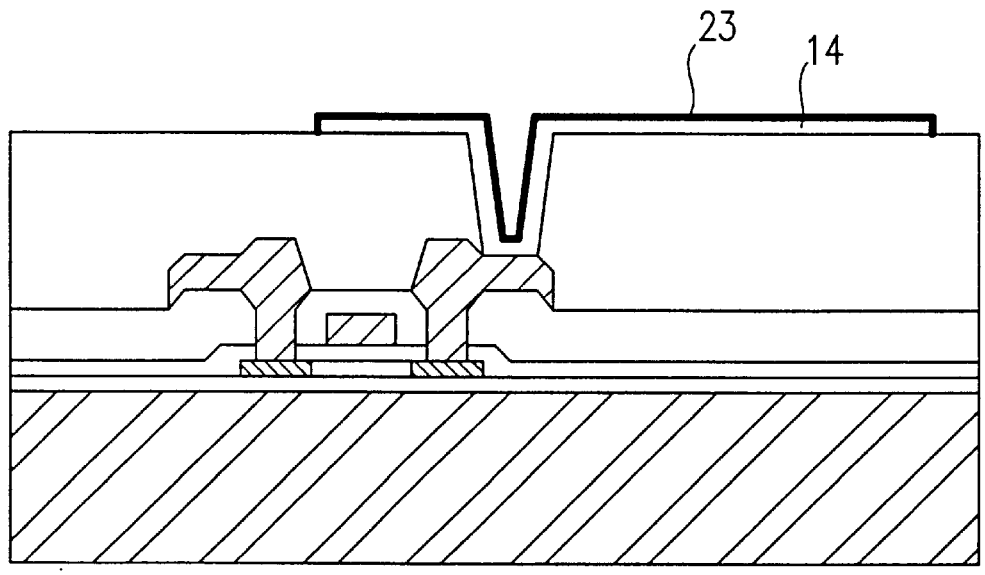

After the active matrix substrate 20 (FIG. 12) is washed, pre-processing is performed as shown in FIG. 9A for improving the adhesiveness. In this example, a gold strike-plate layer 23 is provided between the lower electrode layer 14 and the upper electrode layer 15. As the plating solution, Aurobond TN (produced by Nihon Electroplating Engineers) is used. Strike plating of gold is performed for about 30 seconds while the voltage is controlled, thereby forming a layer which is as thin as only several nanometers. Specifically, a voltage of 4 V is applied to the source common electrode and 10 V is applied to the gate common electrode with the plating solution temperature of 50° C.

The gold strike-plate layer 23 is provided for improving the adhesiveness of the lower electrode layer 14 and the upper electrode layer 15, which is a plating layer, and thus is very thin.

Surface processing using an acid can be used in lieu of strike plating of gold to improve adhesiveness. For example, the lower electrode layer 14 can be immersed in hydrochloric acid for several tens of seconds.

Then, the upper electrode layer 15 is formed by plating using the apparatus shown in FIG. 12. Electroplating is performed after the active matrix substrate 20 is washed by pure water. As a plating solution, Silblex 50 (produced by Nihon Electroplating Engineers), which is a non-cyan plating solution, is used. Electroplating is performed under the conditions of the current density of 1 $A/dm^2$ and the plating solution temperature of 55° C. for about 3 minutes. The gate voltage applied to the gate common electrode 22 is set to be 10 V. After the plating, the resultant layer is washed by water and dried. As the plating solution, Silblex II, which is a cyan plating solution, is also usable.

Figure 9B:
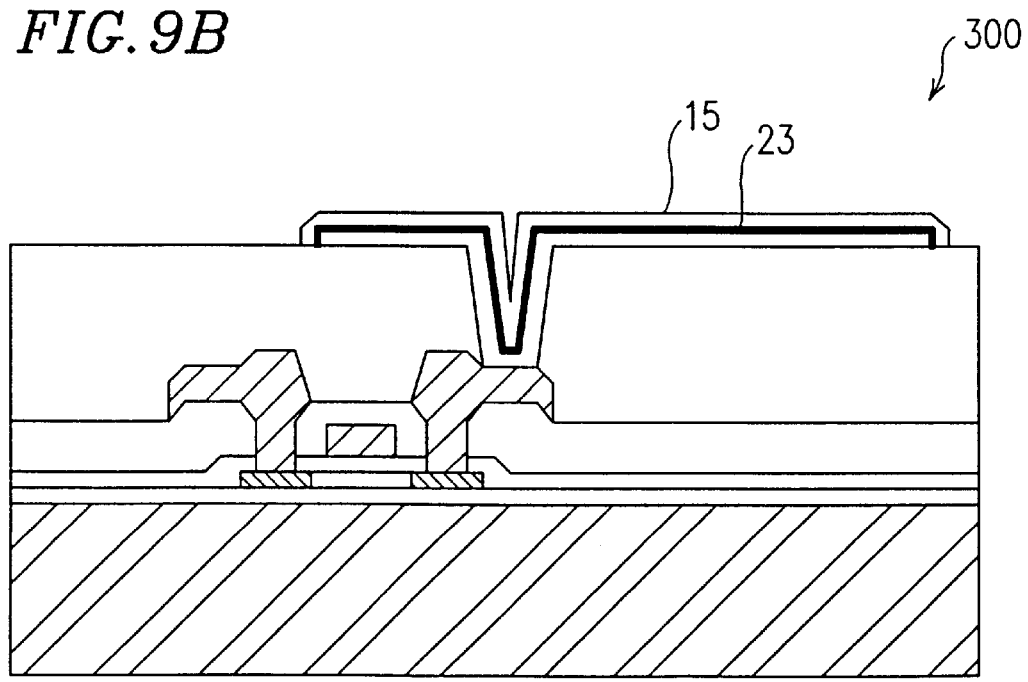

As a result of electroplating, the upper electrode 15 having a thickness of, for example, about 100 nm is formed on the gold strike-plate layer 23 as shown in FIG. 9B. The upper electrode 15 has a reflectance of about 95%. The surface of the upper electrode 15 formed of silver is a mirror surface, which is sufficient to use as a surface of the mirror-surface electrode.

In this example, the upper electrode layer 15 is formed of silver, but a silver alloy is also usable.

Although not shown, the following steps are performed after the upper electrode layer 15 is formed. An alignment layer is formed on the entire surface of the active matrix substrate and aligning treatment is performed. Then, the active matrix substrate is combined with a counter substrate including a counter electrode and optionally a color filter, and a liquid crystal material is injected into a gap between the active matrix substrate and the counter substrate. The reflection-type LCD device 300 (FIG. 9B) produced in this manner provides a sufficiently high reflectance and also a sufficiently high light utilization factor. In the case where such a reflection-type LCD device 300 is incorporated into a projection apparatus, the brightness of resultant images is higher by about 5% compared to the brightness obtained by a conventional reflection-type LCD device including an electrode layer formed of aluminum.

The reflection-type LCD device 300 in the second example provides the same effects as those of the reflection-type LCD device 200 in the first example.

EXAMPLE 3

With reference to FIGS. 10A, 10B, 11A and 11B, a method for producing a reflection-type LCD device 400 in a third example according to the present invention will be described. FIGS. 10A, 10B, 11A and 11B show production steps of the reflection-type LCD device 400. Again for simplicity, the following description will be given regarding one pixel area of the reflection-type LCD device 400. Identical elements described with reference to FIGS. 2 through 5B will bear identical reference numerals and detailed descriptions thereof will be omitted.

Figure 10A:
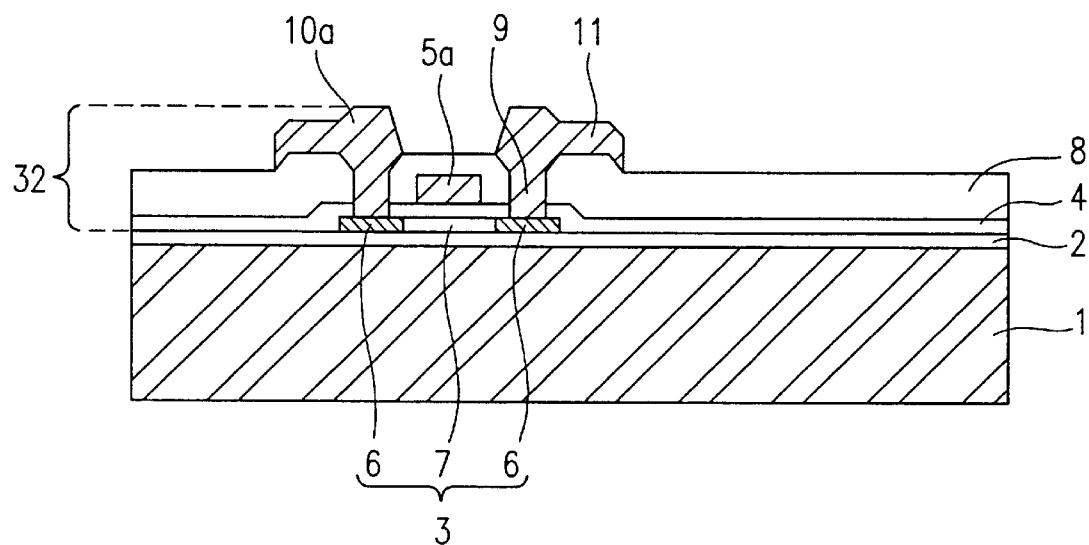
FIGS. 10A, 10B, 11A and 11B are cross-sectional views illustrating production steps of the reflection-type LCD device in a third example according to the present invention.
Figure 10B:
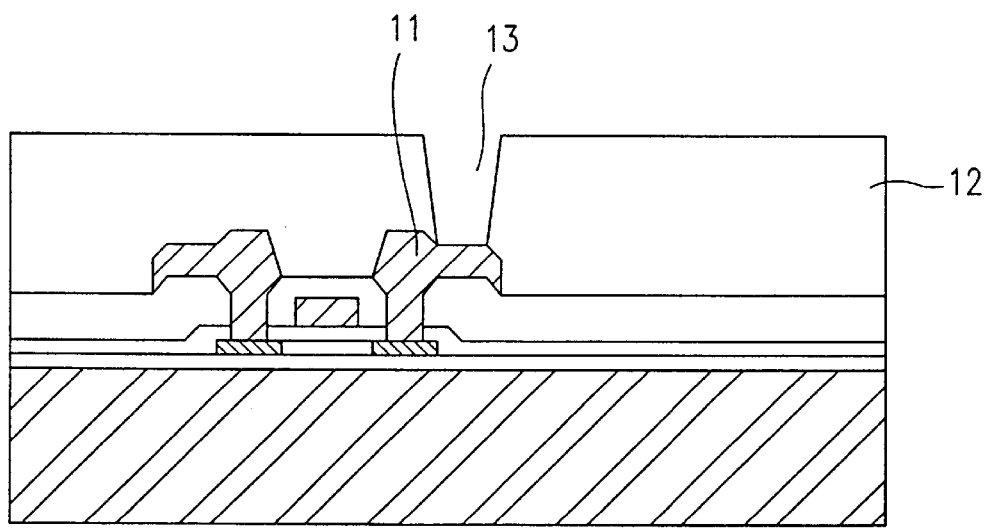

After the TFT 32 is formed as shown in FIG. 10A, the resin insulating layer 12 is formed as shown in FIG. 10B. The contact hole 13 is formed through the resin insulating layer 12. The semiconductor layer 3 of the TFT 32 can be formed of polycrystalline silicon or amorphous silicon, and the TFT 32 can be of an inverted staggered type.

The resin insulating layer 12 is formed by applying a polyimide resin or an acrylic resin on the entire surface of the TFT 32.

When collimated light needs to be reflected in a prescribed direction efficiently as in, for example, projection-type LCD devices, the resin insulating layer 12 preferably has a substantially flat surface. The reason is that the reflection electrode needs to have a flat surface in order to reflect incident light at a maximum efficiency. For forming a scattering surface reflection electrode also, the resin insulating layer 12 preferably has a substantially flat surface. The reason is that a scattering surface reflection electrode formed on an uneven surface with bumps and depressions or a wave or ripple-surface due to the non-uniform thickness is not likely to have uniform scattering characteristics. Application of a resin is performed by a simple method for improving the flatness of the surface, and a substantial flatness can be achieved by selecting an appropriate resin. Chemical and mechanical polishing is also usable in order to achieve a higher flatness, but this method has disadvantages that it is difficult to uniformly polish the entire surface of a large substrate and that the production cost is raised.

In this example, the resin insulating layer 12 is formed of Optomer SS (produced by Japan Synthetic Rubber Co., Ltd.). The resin insulating layer 12 preferably has a thickness of about 2 μm to 4 μm. In this example, the resin insulating layer 12 is formed to have a maximum thickness of about 2 μm.

Then, the contact hole 13 is formed in the resin insulating layer 12 so as to reach the drain electrode 11. The contact hole 13 can be formed by dry etching using oxygen gas. In this example, dry etching is performed under the conditions of the oxygen gas flow rate of 400 sccm, the high frequency power of 600 W and the gas pressure of 200 mTorr. The resin insulating layer 12 can be formed of a light-sensitive material.

Figure 11A:
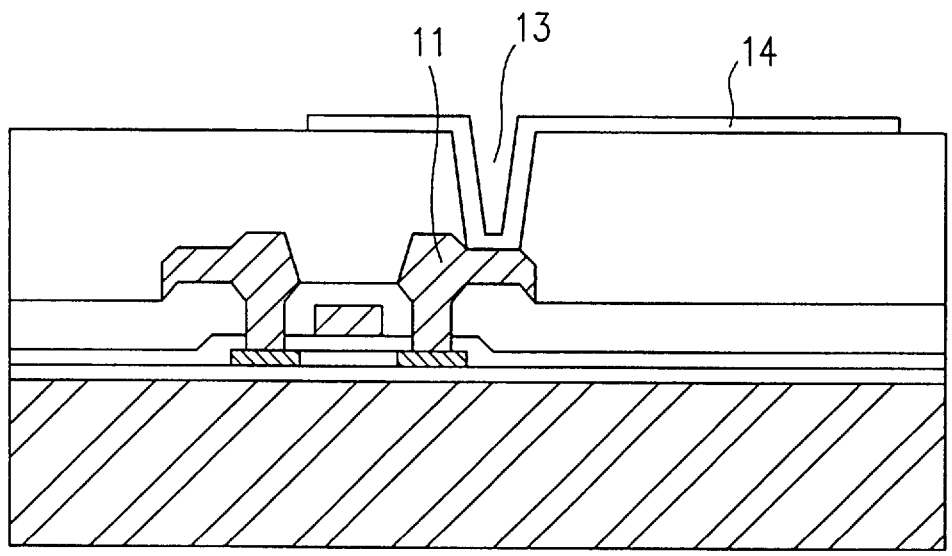

Next, as shown in FIG. 11A, a transparent and electric conductive material such as, for example, ITO or $SnO_2$ or a metal material such as, for example, Cr, Fe, Ni, Co or Cu is deposited on the resin insulating layer 12 so as to cover a surface of the contact hole 13, and patterned by sputtering or photoresist using a mask, thereby forming the lower electrode layer 14. Thus, the lower electrode layer 14 is electrically connected to the drain electrode 11.

The lower electrode layer 14 can be formed of an electric conductive oxide such as, for example, ITO or $SnO_2$. The state of the surface of many metal materials changes as a result of an insulating oxide film being formed thereon. An electric conductive oxide such as ITO or $SnO_2$ is not likely to generate such a phenomenon and thus always guarantees satisfactory conduction.

The lower electrode layer 14 can alternatively be formed of a metal material such as, for example, Cr, Fe, Ni, Co or Cu. The surface of these metal materials is unlikely to be oxidized and also provides a satisfactory adhesiveness when being plated. Accordingly, use of such a metal material for the lower electrode layer 14 facilitates formation of the upper electrode layer 15 on the lower electrode layer 14. These metal materials are relatively easy to deposit by well-known methods such as, for example, sputtering and also allow for precise patterning of about 2 μm to 3 μm by wet etching or dry etching. Accordingly, when the lower electrode layer 14 formed of such a metal material is plated, the silver plating layer (i.e., upper electrode layer 15) is formed in a self-aligning manner on the lower electrode layer 14. This eliminates the necessity of etching of silver, and thus the precise patterning of the lower electrode layer 14 is transmitted to the upper electrode layer 15.

Then, the lower electrode layer 14 is plated with silver using the apparatus shown in FIG. 12 after the active matrix substrate 20 is washed by pure water. As a plating solution, Silblex 50 (produced by Nihon Electroplating Engineers), which is a non-cyan plating solution, is used. Electroplating is performed under the conditions of the current density of 2 $A/dm^2$ and the plating solution temperature of 55° C. for about 5 minutes. The gate voltage applied to the gate common electrode 22 is set to be 10 V. After the plating, the resultant layer is washed by pure water and dried.

Figure 11B:
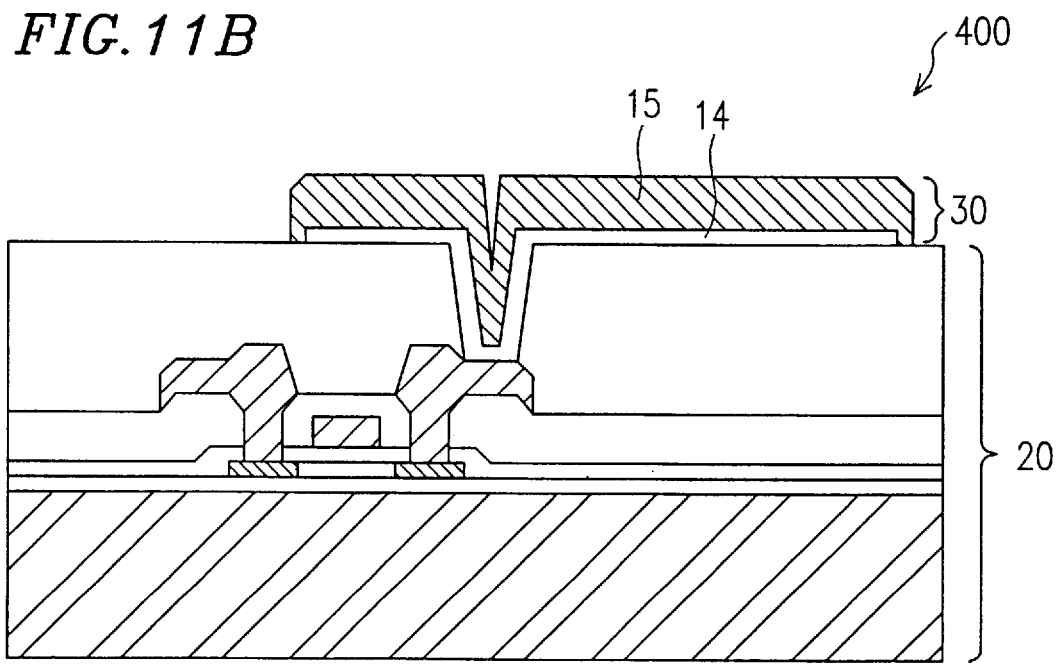

As a result of electroplating, the upper electrode 15 having a thickness of, for example, about 500 nm is formed on the lower electrode layer 14 as shown in FIG. 11B. The upper electrode 15 has a reflectance of about 95%. The surface of the upper electrode 15 formed of silver is a scattering surface, which is sufficient to use as a surface of the scattering electrode.

According to preferable conditions for forming a silver plating layer having a thickness of about 500 nm or more, the current density is 0.5 to 3 $A/dm^2$, the voltage to be applied to the gate electrode 22 is 10 V, the plating solution temperature is 55° C., and the plating is performed for about 3 to 10 minutes. The plating period of about 3 to 10 minutes is set for forming a 2.6-inch VGA (video graphics array) active matrix substrate. Again, the plating period greatly varies in accordance with, for example, the size of the substrate and the TFT pattern in the substrate.

Figure 14:
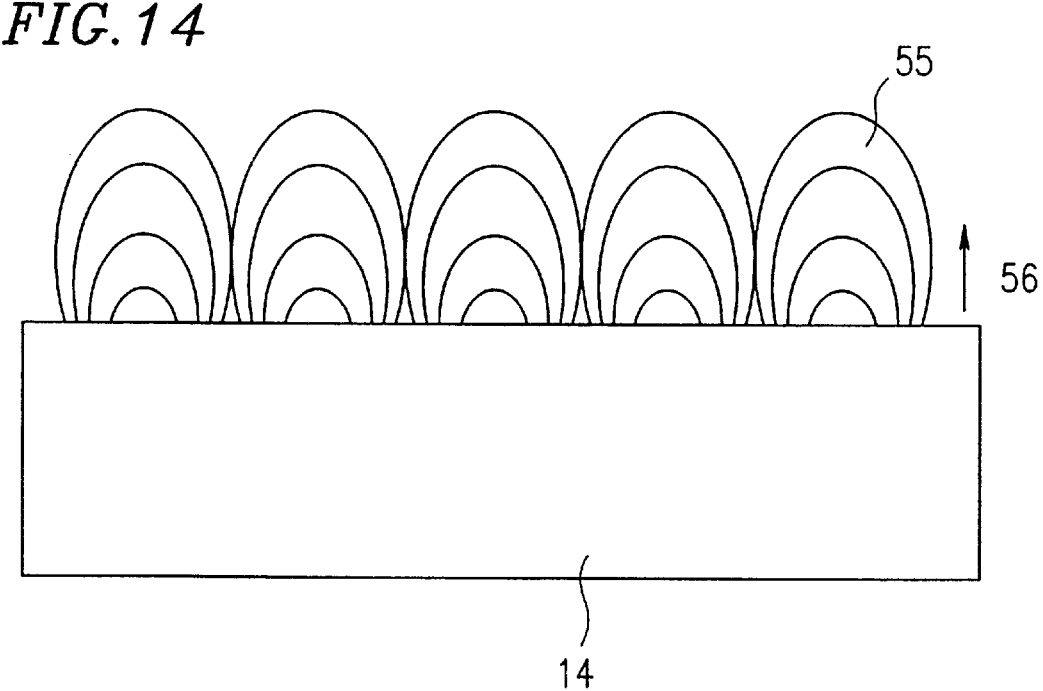
FIG. 14 is a cross-sectional view illustrating crystal growth of a silver layer.
Figure 15:
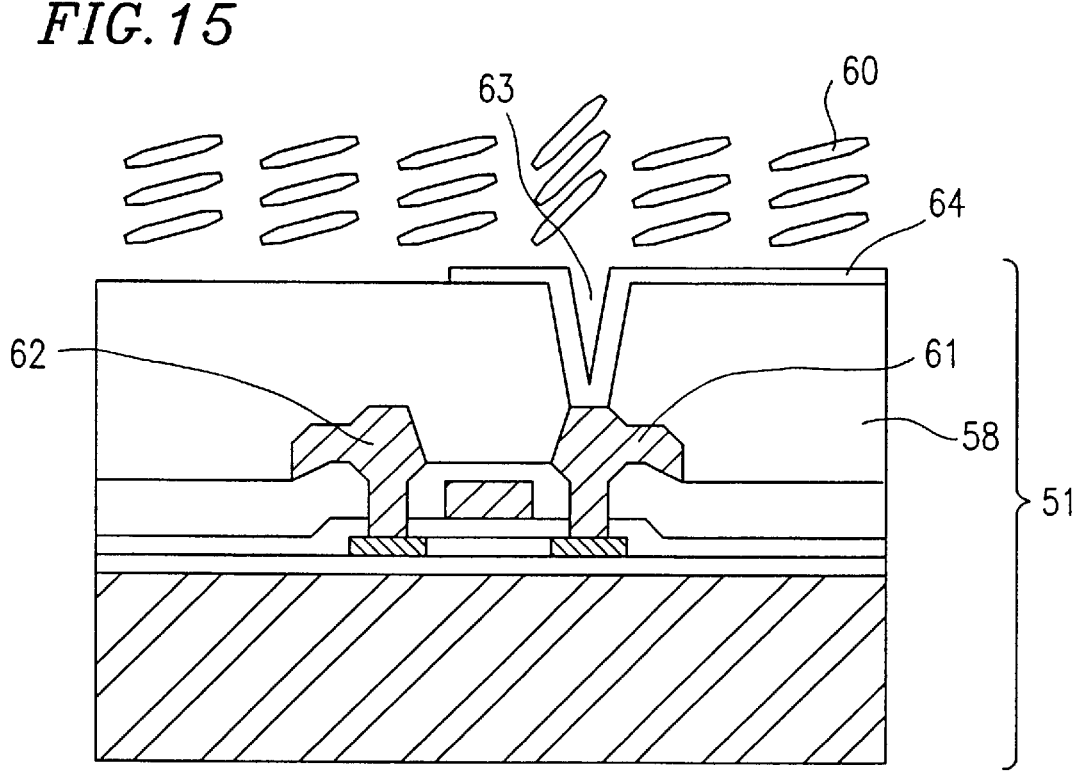
FIG. 15 is a cross-sectional view of a conventional reflection-type LCD device having a pixel-on-passivation structure.

An important factor when forming a scattering surface reflection electrode is the thickness of the upper electrode layer 15, which is a silver plating layer. As shown in FIG. 14, the silver plating layer (i.e., the upper electrode layer 15) increases the thickness thereof in a crystal growth manner after being deposited on the lower electrode layer 14 in the direction of arrow 56. As the silver plating layer grows, very tiny bumps and depressions by the silver crystal grains 55 are also increased and finally have an effect of scattering the light. In other words, as the silver plating layer (i.e., the upper electrode layer 15) grows, the surface thereof gradually changes from a mirror surface to a scattering surface. Accordingly, the surface of the upper electrode layer 15 obtains prescribed reflection characteristics by controlling the thickness of the upper electrode layer 15.

As can be appreciated from FIG. 13, the reflectance of a silver layer does not change much in the thickness range of 70 nm or more. Since the sample shown in FIG. 13 is obtained by vapor deposition, it is thus different from the layer described in this example. However, in the case of a silver layer formed by plating also, the surface of a layer having a thickness of 70 nm or more is a mirror surface and exhibits an especially satisfactory mirror surface state when the thickness is about 100 nm to 200 nm. As the thickness increases, the scattering property increases. A complete scattering surface is obtained when the thickness is about 500 nm or more. In order to use the upper electrode layer 15 as a white scattering surface reflection electrode as in this example, the thickness of the upper electrode layer 15 is preferably about 500 nm or more.

In this example, the upper electrode layer 15 is formed of silver, but a silver alloy is also usable.

Although not shown, the following steps are preformed after the upper electrode layer 15 is formed. An alignment layer is formed on the entire surface of the active matrix substrate and aligning treatment is performed. Then, the active matrix substrate is combined with a counter substrate including a counter electrode and optionally a color filter, and a liquid crystal material is injected into a gap between the active matrix substrate and the counter substrate.

The reflection-type LCD device 400 (FIG. 11B) in which the upper electrode layer 15 has a scattering surface provides satisfactory scattering characteristics. In the case where such a reflection-type LCD device 400 is used as a direct-view reflection-type LCD device, satisfactory display is realized without the view around the LCD device being reflected in the displayed image. Such a reflection-type LCD device is suitable for mobile information devices.

As described above, a reflection-type LCD device and a method for producing the same according to the present invention use silver or a silver alloy for the reflection electrode (i.e., the upper electrode layer) in lieu of aluminum which is conventionally used. Therefore, the light utilization factor is improved and the display is brighter by about 5%.

As an apparatus for forming the upper electrode layer by plating, a conventional LCD device production apparatus is usable by adding a simple plating device. The number of production steps does not significantly increase. Thus, the reflection-type LCD device is produced efficiently.

The upper electrode layer is formed by plating the lower electrode layer with silver or a silver alloy, patterning is not necessary. The high processing precision of the lower electrode layer is easily transmitted to the upper electrode layer.

The surface of the upper electrode layer is controlled to have a prescribed reflection characteristic by adjusting the thickness of the upper electrode layer. For example, when the upper electrode layer is used as a scattering surface reflection electrode, the surface of the upper electrode layer is made uneven by controlling the thickness of the upper electrode layer so as to scatter light. Thus, the production method is significantly simplified compared to the conventional method.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflection-type liquid crystal display device, comprising:
    a first substrate including a plurality of pixel electrodes arranged in a matrix and switching devices for driving the pixel electrodes;
    a second substrate including a counter electrode; and
    a liquid crystal layer interposed between the first substrate and the second substrate,
    wherein the pixel electrodes each include a lower electrode layer and an upper electrode layer, and the upper electrode layer is formed of either silver or a silver alloy and is reflective, and wherein the lower electrode layer is provided on an insulating layer, which is provided to cover steps on the substrate to provide a substantially flat surface, the lower electrode layer being connected to the respective switching device through a contact hole formed in the insulating layer.

2. A reflection-type liquid crystal display device according to claim 1, wherein the upper electrode layer has a mirror surface.

3. A reflection-type liquid crystal display device according to claim 2, wherein the upper electrode layer has a thickness of about 100 nm to about 200 nm.

4. A reflection-type liquid crystal display device according to claim 1, wherein the upper electrode layer has a scattering surface.

5. A reflection-type liquid crystal display device according to claim 4, wherein the upper electrode layer has a thickness of about 500 nm or more.

6. A reflection-type liquid crystal display device according to claim 1, wherein the lower electrode layer has a first layer formed of one material selected from the group consisting of an electric conductive oxide, Cr, Fe, Ni, Co and Cu, and the upper electrode layer is provided on the first layer.

7. A reflection-type liquid crystal display device according to claim 6, wherein the lower electrode layer further has a second layer formed of a metal material, and the first layer is formed of an electric conductive oxide and provided on the second layer.

8. A reflection-type liquid crystal display device according to claim 6; further comprising a gold strike-plate layer between the lower electrode layer and the upper electrode layer.

9. A reflection-type liquid crystal display device according to claim 1, wherein the lower electrode layer has a substantially flat surface.

10. A reflection-type liquid crystal display device according to claim 1, wherein the insulating layer is made of a resin.

11. A method for producing a reflection-type liquid crystal display device including a first substrate including a plurality of pixel electrodes arranged in a matrix and switching devices for driving the pixel electrodes, a second substrate including a counter electrode, and a liquid crystal layer interposed between the first substrate and the second substrate, the method comprising the step of:
    forming the pixel electrodes connected to the switching devices, the step of forming the pixel electrodes includes the steps of:
    forming a lower electrode layer; and
    forming an upper electrode layer of either silver or a silver alloy on a surface of the lower electrode layer in a self-alignment manner by electroplating while controlling the upper electrode layer to have a thickness so that the upper electrode layer has a prescribed reflection characteristic.

12. A method for producing a reflection-type liquid crystal display device according to claim 11, wherein the step of forming the lower electrode layer includes the step of forming a first layer of one material selected from the group consisting of an electric conductive oxide, Cr, Fe, Ni, Co and Cu, and the step of forming the upper electrode layer includes the step of forming the upper electrode layer on the first layer.

13. A method for producing a reflection-type liquid crystal display device according to claim 12, wherein the step of forming the pixel electrodes further comprises the step of performing pre-processing of the lower electrode layer after the formation of the lower electrode layer so as to improve an adhesiveness of the lower electrode layer with the upper electrode layer.

14. A method for producing a reflection-type liquid crystal display device according to claim 11, wherein the step of forming the lower electrode layer includes the steps of:
    forming a first layer of an electric conductive oxide;
    forming a second layer of a metal material; and
    locating the first layer on the second layer.

15. A method for producing a reflection-type liquid crystal display device according to claim 11, wherein the step of forming the upper electrode layer includes the step of forming the upper electrode layer to a thickness of about 100 nm to about 200 nm so that the upper electrode layer has a mirror surface.

16. A method for producing a reflection-type liquid crystal display device according to claim 11, wherein the step of forming the upper electrode layer includes the step of forming the upper electrode layer to a thickness of about 500 nm or more so that the upper electrode layer has a scattering surface.

17. A method for producing a reflection-type liquid crystal display device according to claim 11, wherein the step of forming the lower electrode layer includes the step of forming the lower electrode layer so as to have a substantially flat surface.

18. A reflection-type liquid crystal display device according to claim 11, wherein the upper electrode layer has substantially the same shape as that of the lower electrode layer.

19. A reflection-type liquid crystal display device, comprising:
   a first substrate;
   a second substrate; and
   a liquid crystal layer interposed between the first substrate and the second substrate,
   wherein the first substrate and the second substrate respectively include a first electrode and a second electrode for applying a voltage to the liquid crystal layer,
   the first electrode includes a lower electrode layer and an upper electrode layer covering a surface of the lower electrode layer,
   the upper electrode layer is formed of either silver or a silver alloy and is reflective, and
   the lower electrode layer is provided on an insulating layer, which is provided to cover steps on the substrate to provide a substantially flat surface, the lower electrode layer being connected to the respective switching device through a contact hole formed in the insulating layer.

20. A reflection-type liquid crystal display device according to claim 19, wherein the lower electrode layer includes a first layer formed of one material selected from the group consisting of an electric conductive oxide, Cr, Fe, Ni, Co and Cu, and the upper electrode layer is provided on the first layer.

21. A reflection-type liquid crystal display device according to claim 20, wherein the lower electrode layer further has a second layer formed of a metal material, and the first layer is formed of an electric conductive oxide and provided on the second layer.

22. A reflection-type liquid crystal display device according to claim 20, further comprising a gold strikeplate layer between the lower electrode layer and the upper electrode layer.

23. A reflection-type liquid crystal display device according to claim 19, wherein the upper electrode layer has a mirror surface.

24. A reflection-type liquid crystal display device according to claim 23, wherein the upper electrode layer has a thickness of about 100 nm to about 200 nm.

25. A reflection-type liquid crystal display device according to claim 19, wherein the lower electrode layer has a substantially flat surface.

26. A reflection-type liquid crystal display device according to claim 19, wherein the insulating layer is made of a resin.

27. A method for producing a reflection-type liquid crystal display device including a first substrate having a first electrode; a second substrate having a second electrode; and a liquid crystal layer interposed between the first substrate and the second substrate, the method comprising the step of:
   forming the first electrode, the step of forming the first electrode includes the steps of:
   forming a lower electrode layer; and
   forming an upper electrode layer of either silver or a silver alloy on a surface of the lower electrode layer in a self-alignment manner by electroplating while controlling the upper electrode layer to have a thickness so that the upper electrode layer has a prescribed reflection characteristic.

28. A method for producing a reflection-type liquid crystal display device according to claim 21, wherein the step of forming the lower electrode layer includes the steps of forming a first layer of one material selected from the group consisting of an electric conductive oxide, Cr, Fe, Ni, Co and Cu, and the step of forming the upper electrode layer includes the step of forming the upper electrode layer on the first layer.

29. A method for producing a reflection-type liquid crystal display device according to claim 28, wherein the step of forming the pixel electrodes further comprises the step of performing pre-processing of the lower electrode layer after the formation of the lower electrode layer so as to improve an adhesiveness of the lower electrode layer with the upper electrode layer.

30. A reflection-type liquid crystal display device according to claim 27, wherein the upper electrode layer has substantially the same shape as that of the lower electrode layer.

31. A method for producing a reflection-type liquid crystal display device according to claim 27, wherein the step of forming the lower electrode layer includes the steps of:
   forming a first layer of an electric conductive oxide;
   forming a second layer of a metal material; and
   locating the first layer on the second layer.

32. A method for producing a reflection-type liquid crystal display device according to claim 27, wherein the step of forming the upper electrode layer includes the step of forming the upper electrode layer to a thickness of about 100 nm to about 200 nm so that the upper electrode layer has a mirror surface.

33. A method for producing a reflection-type liquid crystal display device according to claim 27, wherein the step of forming the upper electrode layer includes the step of forming the upper electrode layer to a thickness of about 500 nm or more so that the upper electrode layer has a scattering surface.

34. A method for producing a reflection-type liquid crystal display device according to claim 27, wherein the step of forming the lower electrode layer includes the step of forming the lower electrode layer so as to have a substantially flat surface.

35. A reflection-type liquid crystal display device, comprising:
   a first substrate including a plurality of pixel electrodes arranged in a matrix and switching devices for driving the pixel electrodes;
   a second substrate including a counter electrode; and
   a liquid crystal layer interposed between the first substrate and the second substrate,
   wherein the pixel electrodes each include a lower electrode layer and an upper electrode layer, and the upper electrode layer is formed of either silver or a silver alloy and is reflective, and wherein the lower electrode layer is provided on an insulating layer, which is provided to cover steps on the substrate to provide an uneven surface, the lower electrode layer being connected to the respective switching device through a contact hole formed in the insulating layer.

36. A reflection-type liquid crystal display device according to claim 35, wherein the upper electrode layer has a scattering surface.

37. A reflection-type liquid crystal display device according to claim 36, wherein the upper electrode layer has a thickness of about 500 nm or more.

38. A reflection-type liquid crystal display device according to claim 35, wherein the lower electrode layer has a first layer formed of one material selected from the group consisting of an electric conductive oxide, Cr, Fe, Ni, Co and Cu, and the upper electrode layer is provided on the first layer.

39. A reflection-type liquid crystal display device according to claim 38, wherein the lower electrode layer further has a second layer formed of a metal material, and the first layer is formed of an electric conductive oxide and provided on the second layer.

40. A reflection-type liquid crystal display device according to claim 38, further comprising a gold strikeplate layer between the lower electrode layer and the upper electrode layer.

41. A reflection-type liquid crystal display device according to claim 35, wherein the lower electrode layer has a substantially flat surface.

42. A reflection-type liquid crystal display device according to claim 35, wherein the insulating layer is made of a resin.

43. A reflection-type liquid crystal display device, comprising:
   a first substrate;
   a second substrate; and
   a liquid crystal layer interposed between the first substrate and the second substrate,
   wherein the first substrate and the second substrate respectively include a first electrode and a second electrode for applying a voltage to the liquid crystal layer,
   the first electrode includes a lower electrode layer and an upper electrode layer covering a surface of the lower electrode layer,
   the upper electrode layer is formed of either silver or a silver alloy and is reflective, and
   the lower electrode layer is provided on an insulating layer, which is provided to cover steps on the substrate to provide an uneven surface, the lower electrode layer being connected to the respective switching device through a contact hole formed in the insulating layer.

44. A reflection-type liquid crystal display device according to claim 43, wherein the upper electrode layer has a scattering surface.

45. A reflection-type liquid crystal display device according to claim 44, wherein the upper electrode layer has a thickness of about 500 nm or more.

46. A reflection-type liquid crystal display device according to claim 43, wherein the lower electrode layer has a first layer formed of one material selected from the group consisting of an electric conductive oxide, Cr, Fe, Ni, Co and Cu, and the upper electrode layer is provided on the first layer.

47. A reflection-type liquid crystal display device according to claim 46, wherein the lower electrode layer further has a second layer formed of a metal material, and the first layer is formed of an electric conductive oxide and provided on the second layer.

48. A reflection-type liquid crystal display device according to claim 46, further comprising a gold strikeplate layer between the lower electrode layer and the upper electrode layer.

49. A reflection-type liquid crystal display device according to claim 43, wherein the lower electrode layer has a substantially flat surface.

50. A reflection-type liquid crystal display device according to claim 43, wherein the insulating layer is made of a resin.

* * * * *

UNITED STATES PATENT AND TRADEMARK OFFICE
CERTIFICATE OF CORRECTION

PATENT NO.    : 6,081,310
DATED         : June 27, 2000
INVENTOR(S)   : Katsuya et al.

It is certified that error appears in the above-identified patent and that said Letters Patent is hereby corrected as shown below:

Title page:
Delete "[54] REFLECTION-TYPE LIQUID CRYSTAL DISPLAY HAVING A SILVER OR SILVER ALLOY UPPER ELECTRODE LAYER"

and insert therefor

--[54] REFLECTION-TYPE LIQUID CRYSTAL DISPLAY DEVICE AND METHOD FOR PRODUCING THE SAME--

Column 1,
Lines 1-3 Delete "REFLECTION-TYPE LIQUID CRYSTAL DISPLAY HAVING A SILVER OR SILVER ALLOY UPPER ELECTRODE LAYER" and insert therefor -- REFLECTION-TYPE LIQUID CRYSTAL DISPLAY DEVICE AND METHOD FOR PRODUCING THE SAME--.

Signed and Sealed this

Tenth Day of July, 2001

Attest:

*Nicholas P. Godici*

NICHOLAS P. GODICI
*Attesting Officer*        *Acting Director of the United States Patent and Trademark Office*